Nov. 21, 1961  G. AGINS  3,009,361
INSTRUMENT STABILIZATION SYSTEM
Filed March 29, 1947  4 Sheets-Sheet 1

INVENTOR.
GEORGE AGINS
BY
HIS ATTORNEYS.

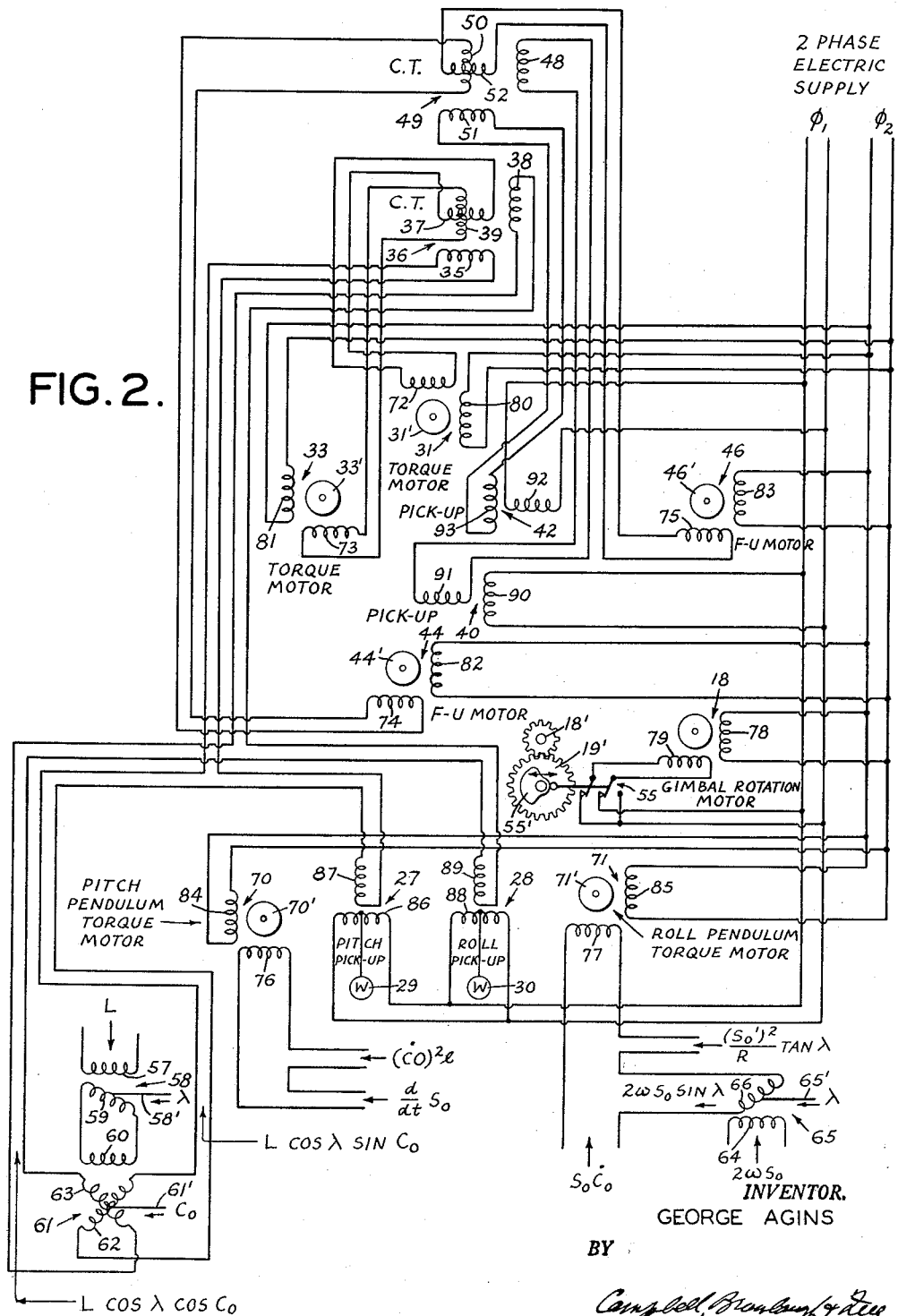

Nov. 21, 1961

G. AGINS 3,009,361

INSTRUMENT STABILIZATION SYSTEM

Filed March 29, 1947

INVENTOR.
GEORGE AGINS
BY
Campbell, Brumbaugh & Lee
HIS ATTORNEY.

Nov. 21, 1961 G. AGINS 3,009,361
INSTRUMENT STABILIZATION SYSTEM
Filed March 29, 1947 4 Sheets-Sheet 4
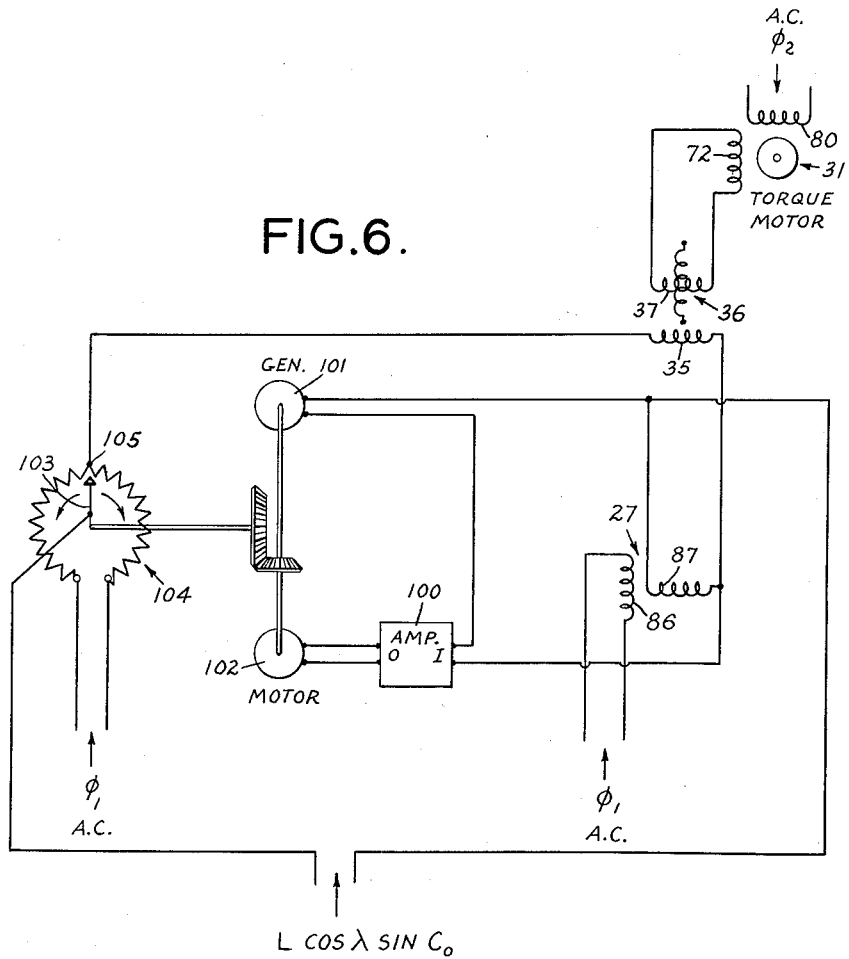
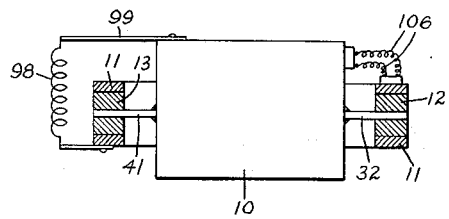
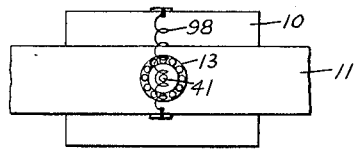
INVENTOR.
GEORGE AGINS
BY
*Campbell, Brumbaugh & Lee*
HIS ATTORNEYS.

# United States Patent Office 3,009,361
Patented Nov. 21, 1961

3,009,361
INSTRUMENT STABILIZATION SYSTEM
George Agins, Brooklyn, N.Y., assignor to American Bosch Arma Corporation, a corporation of New York
Filed Mar. 29, 1947, Ser. No. 738,242
23 Claims. (Cl. 74—5.47)

This invention relates to stabilizing systems for instruments, and has particular reference to gyroscopic elements provided with gravity control, which afford and maintain a stable vertical reference axis for fire control instruments and the like, mounted on unstable platforms such as ships, aircraft, etc.

In accordance with the present invention, the vertical spin axis of the gyroscope of the stable element is caused to erect into the true vertical position by the action of gravity on suspended weights or pendulums, and corrective means are provided to eliminate the effects of error-producing forces which may act upon the stable element. These corrective means are arranged to eliminate the effects of the following error-producing factors which act upon the gyroscope: earth's rotation, friction in gimbal bearings, flexes stiffness reactance, centrifugal force of tilted rotating gimbal ring, unbalance of rotating gimbal system, and constant errors. The corrective means are also arranged to eliminate the effects of the following error-producing factors which act upon the pendulums: rate of change of speed of own ship, skid effect during turning of own ship, Coriolis' acceleration, rate of change of course of own ship, and east-west motion of own ship.

For a more complete understanding of the invention, reference may be had to the accompanying drawings, in which:

FIG. 2 is a schematic diagram of electrical system for the stable element;

FIG. 4 is a schematic diagram of the inner rotating gimbal system, for the $\theta$ rotational position;

FIG. 4a is a torque vector diagram for FIG. 4, similar to that of FIG. 3a;

FIG. 6 is a schematic diagram of the corrective means for eliminating the effects of constant errors on the gyroscope; and, FIGS. 7 and 8 illustrate a side elevation and partial axial section through an organization including an upsetting spring for neutralizing the flexes stiffness reactance of the inner rotating gimbal system.

Figure 1:
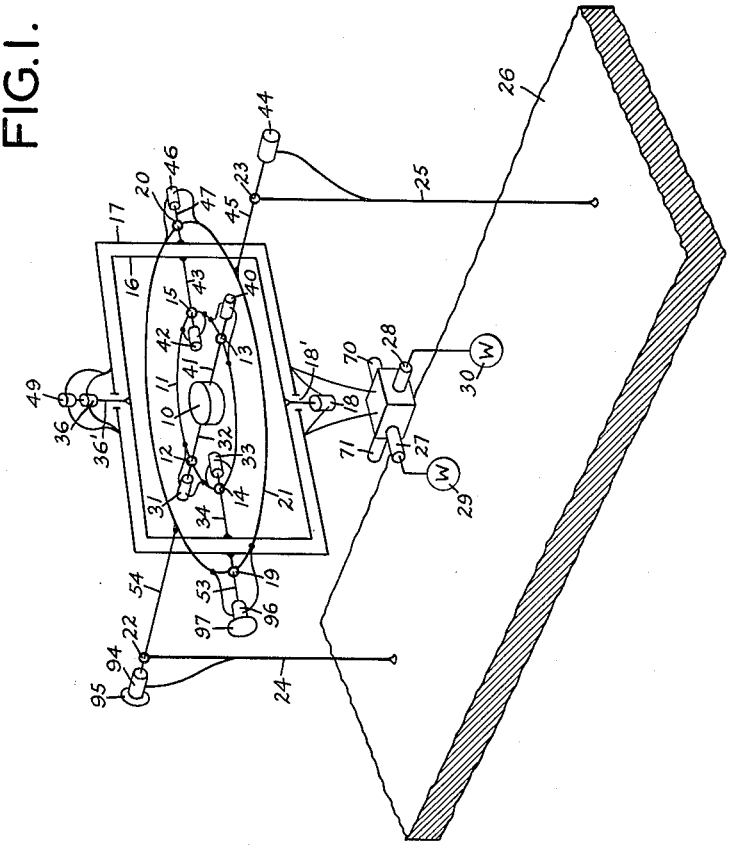
FIGURE 1 is a schematic perspective view of the stable element of the invention.

Referring to FIGS. 1 and 2 of the drawings, it is initially considered for the purpose of simplicity of description, that the entire system is in its energized operating condition, and that all movable parts of the system are in the instantaneous positions where (a) the unstable platform is level with respect to two mutually perpendicular horizontal axes, (b) the vertical spin axis of the gyroscope indicates the true vertical, (c) the outer stabilized gimbal system is aligned with the inner rotating gimbal system, and (d) the rotating inner gimbal system is in the position where the mutually perpendicular swing axes of the rotating inner gimbal system are aligned with the mutually perpendicular swing axes of the outer stabilized gimbal system.

In FIG. 1, numeral 10 designates a vertical spin axis gyroscope, which may be of the type in which the spinning element is the rotor of a polyphase induction motor whose stator is inside the gyroscope case and is energized from a suitable polyphase alternating current supply, not shown. Gyroscope 10 is shown as mounted in neutral equilibrium, i.e., it is neither top-heavy nor pendulous, and it is endowed with three degrees of freedom by being universally mounted on a gimbal support by its opposite shafts 32 and 41 in bearings 12 and 13 on inner gimbal ring 11, in turn pivoted by opposite bearings 14 and 15 on shafts 34 and 43 carried by inner vertical frame 16. The horizontal axis through bearings 12 and 13, and the horizontal axis throught bearings 14 and 15, are mutually perpendicular, and the intersection of these axes is at a point on the vertical spin axis of the rotor of gyroscope 10.

Inner vertical frame 16 continuously rotates within outer vertical frame 17 about a central vertical axis, being connected to the shaft extension 18' of gimbal rotation motor 18 carried by outer vertical frame 17. Motor 18 has two field windings 78 and 79, respectively connected to $\phi_2$ and $\phi_1$ of the two-phase alternating current supply, as shown in FIG. 2. When a fixed voltage from one phase of the two-phase alternating current supply is applied to the main field winding of the motor, and a variable voltage from the other phase of the two-phase alternating current supply is applied to the control field winding of the motor, the torque of the motor is directly proportional to the magnitude of the variable voltage applied to the control field winding. Interposed in the circuit of winding 79 is a switch 55 for changing the phase sequence of the voltages applied to the motor 18 to thereby reverse the same, switch 55 being actuated periodically by a cam 55' rotated by shaft 18' through reduction gearing 19', illustrated in FIG. 2.

Outer vertical frame 17 is supported within outer stabilized gimbal ring 21 by means of its supporting shafts 47 and 53, which are journalled near their outer ends respectively in bearings 20 and 19 on the outer gimbal ring 21. Outer gimbal ring 21 is supported by means of supporting shafts 45 54 journalled near their outer ends respectively in bearings 23 and 22 of vertical supports 25 and 24, which are secured at their lower ends to the unstable platform 26, of which a fragment is shown in FIG. 1.

The horizontal axis through bearings 19 and 20, and the horizontal axis through bearings 22 and 23, are mutually perpendicular, and the intersection of these axes is at a point on the vertical axis about which the inner rotating gimbal system rotates. The entire apparatus thus described is so aligned when installed upon the unstable platform 26 that the axis through bearings 22 and 23 is the axis about which the roll angles of the unstable platform are measured, and the axis at right angles thereto, through bearings 19 and 20, is the axis about which the pitch angles of the unstable platform are measured. Thus, if the unstable platform is a ship, supports 24 and 25 are mounted in a fore-and-aft vertical plane.

Carried by outer vertical frame 17, directly below the gimbal rotation motor 18, are electrical pick-up devices 27 and 28 with their axes of rotation mutually perpendicular, with the rotation axis of pick-up device 27 parallel to the horizontal axis through bearings 19 and 20, and with the rotation axis of pick-up device 28 parallel to the horizontal axis through bearings 22 and 23. Secured to and suspended from the shaft extension of electrical pick-up device 27 is a pendulous weight 29, which is free to swing only in a fore-and-aft vertical plane. Secured to the shaft extension of electrical pick-up device 28 is a similar pendulum 30, which is free to swing only in an athwartship vertical plane. The pendulums 29 and 30 are suitably damped by viscous damping means of well-known construction but not shown.

As shown particularly in FIG. 2, electrical pick-up devices 27 and 28 are essentially transformers whose respective primary windings 86 and 88 are connected so as to be rotated by the corresponding pendulums 29 and 30. In construction, these pick-up devices include a rotor of suitable laminated magnetic material which is cooperatively rotatable within a stator of suitable laminated magnetic material. Two independent distributed electrical windings are affixed to the stator and two independent distributed electrical windings are carried by the rotor. The distribution of the electrical windings on both stator and rotor is such that the magnetic axes of the windings on the stator are in space quadrature relation to each other, and the magnetic axes of the windings on the rotor are in space quadrature relation to each other. In the description of the operation of the electrical pick-up device, the expression "displacement angle" is used to denote the relative angular displacement of the rotor of the unit with respect to its stator, from a selected zero position.

In the electrical pick-up devices 27 and 28, only one stator winding and one rotor winding are used. The zero position of each electrical pick-up device is selected so that when the primary winding is energized by an alternating current voltage, the voltage induced in the secondary winding is directly proportional to the sine function of the displacement angle so that zero voltage output is obtained at zero displacement angle (sin 0°=0). In view of the very small displacement angles to which the electrical pick-up devices 27 and 28 are subjected, the output voltages are substantially proportional to the respective displacement angles. Further details of construction of electrical pick-up devices 27 and 28 may be had upon reference to corresponding application Serial No. 607,614, filed July 28, 1945, by applicant.

The primary winding 86 of electrical pick-up device 27 is electrically connected to $\phi_1$ of the two-phase alternating current supply, while the secondary winding 87 of the pick-up device 27 is electrically connected to primary winding 35 of coordinate transformer 36. Coordinate transformer 36 is constructed like pick-up devices 27 and 28, shown in FIG. 2, its two primary windings 35 and 38 being carried by the extension 36' of the upper supporting shaft of frame 16 and its two secondary windings 37 and 39 being carried by the outer vertical frame 17.

The zero position is selected so that when only one of the two primary windings is energized by an alternating current voltage, the output voltage of one secondary winding is directly proportional to the sine function of the displacement angle, and the output voltage of the other secondary winding is directly proportional to the cosine function of the displacement angle. When both primary windings are energized by alternating current voltages which are in time phase relation to each other, the resultant magnetic flux set up in the primary causes voltages to be induced in both secondary windings. The voltage induced in either secondary winding is equal to the sum of the voltages induced in it by each of the primary windings. Considering that voltage A is applied to one primary winding, and that voltage B is applied to the other primary winding, then the voltage induced in one secondary winding is proportional to $A \sin \theta + B \cos \theta$, and the voltage induced in the other secondary winding is proportional to $A \cos \theta - B \sin \theta$, where $\theta$ is the displacement angle of the coordinate transformer.

The secondary winding 37 of coordinate transformer 36 is electrically connected to the control winding 72 of torque motor 31, while the main field winding 80 of torque motor 31 is electrically connected to $\phi_2$ of the two-phase alternating current supply, as shown in FIG. 2. Similarly, the primary winding 88 of electrical pick-up device 28 is electrically connected to $\phi_2$ of the two-phase alternating current supply, while the secondary winding 89 of the pick-up device 28 is electrically connected to primary winding 38 of coordinate transformer 36. The secondary winding 39 of the coordinate transformer 36 is electrically connected to the control winding 73 of torque motor 33, while the main field winding 81 of torque motor 33 is electrically connected to $\phi_2$ of the two-phase alternating current supply. The inputs to the primary windings 35 and 38 of coordinate transformer 36 include additional voltage sources 62 and 63 connected in series with the outputs of pick-up devices 27 and 28, respectively, as shown in FIG. 2. Voltage sources 62 and 63 are the rotor windings of electrical resolver 61 similar in construction to pick-up devices 27, 28, 40 and 42, using one primary winding and two secondary windings, and its zero position is selected so that the output voltage of one secondary winding is directly proportional to the sine function of the displacement angle, and the output voltage of the other secondary winding is directly proportional to the cosine function of the displacement angle. The windings 62 and 63 are mounted as secondary windings at right angles on a shaft 61' rotated through a determined angle in the field of stationary stator or primary winding 60 energized by a voltage corresponding to the hypotenuse of a right triangle. Inasmuch as secondary windings 62 and 63 are arranged at right angles, the output voltage of one of them is directly proportional to the sine function of the displacement angle of shaft 61' and the output of the other rotor winding is directly proportional to the cosine function of that angle.

The electrical resolver 58 is similar to electrical pick-up devices 27, 28, 40 and 42, but its zero position is selected so that its output voltage is directly proportional to the cosine function of its displacement angle, whereby maximum voltage output is obtained at zero displacement angle, (cos 0°=1).

Torque motors 31 and 33 are arranged to exert a correcting torque about the respective axes of shafts 32 and 34, the former being the suspension axis of the gyroscope 10 and the latter the suspension axis of inner gimbal ring 11. Details of construction of torque motors 31 and 33 may be had upon reference to said copending application Serial No. 607,614, and now abandoned, or copending application Serial No. 600,606, filed June 20, 1945, and now Patent No. 2,827,544, by applicant.

The frame of torque motor 31 is secured to and carried by inner gimbal ring 11, and the shaft extension of the rotor 31' of the motor is coupled to the gyroscope supporting shaft 32, so that the operation of torque motor 31 applies a torque to gyroscope 10, about the suspension axis of the gyroscope through bearings 12 and 13. Similarly, the frame of torque motor 33 is secured to and carried by inner gimbal ring 11, and the shaft extension of the rotor 33' of the motor is coupled to the supporting shaft 34 of inner gimbal ring 11, so that the operation of torque motor applies a torque to gyroscope 10, about the suspension axis of gimbal ring 11 through bearings 14 and 15.

Mounted with its axis of rotation coincident with the suspension axis of gyroscope 10 is electrical pick-up device 40 which is constructed like electrical pick-up devices 27 and 28 in that rotation of its primary or rotor winding 90 induces a voltage in relatively stationary secondary winding 91 which is utilized to energize the control winding of follow-up motor 44 acting about the suspension axis of gimbal ring 21. Similarly, electrical pick-up device 42 acts to control follow-up motor 46, acting about the suspension axis of outer vertical frame 17. To these ends the frame of electrical pick-up device 40 is secured to and carried by inner gimbal ring 11, and the shaft extension of the rotor of the pick-up device 40 is coupled to the supporting shaft 41 of gyroscope 10, so that relative movement of gimbal ring 11 about shaft 41 angularly displaces the rotor of the pick-up device 40 relatively to its stator. Similarly, the frame of electrical pick-up device 42 is secured to and carried by inner gimbal ring 11, and the shaft extension of the rotor of the pick-up device 42 is coupled to the supporting shaft 43 of gimbal ring 11, so that relative movement of gimbal ring 11 about shaft 43 angularly displaces the rotor of the pick-up device 42 relatively to its stator.

As to the corresponding follow-up motors, the frame of motor 44 is secured to and carried by vertical support 25, and the shaft extension of the rotor 44' of this motor is coupled to the supporting shaft 45 of outer stabilized gimbal ring 21, so that the operation of follow-up motor 44 rotates outer stabilized gimbal ring 21 about the axis through bearings 22 and 23. The frame of follow-up motor 46 is secured to and carried by outer stabilized gimbal ring 21, and the shaft extension of the rotor 46' of this follow-up motor is coupled to the supporting shaft 47 of outer vertical frame 17, so that the operation of follow-up motor 46 rotates the outer vertical frame 17 about the axis through bearings 19 and 20.

Referring particularly to FIG. 2, the primary winding 90 of electrical pick-up device 40 is electrically connected to $\phi_1$ of the two-phase alternating current supply, while the secondary winding 91 of the pick-up device 40 is electrically connected to the primary widning 48 of coordinate transformer 49. Like coordinate transformer 36, coordinate transformer 49 has two primary windings 48 and 51 carried by the shaft extension 36' of inner vertical frame 16, and two secondary windings 50 and 52 carried by the outer vertical frame 17, as shown in FIGS. 1 and 2.

The secondary winding 50 of coordinate transformer 49 is electrically connected to the control winding 74 of follow-up motor 44, while the main field winding 82 of follow-up motor 44 is electrically connected to $\phi_2$ of the two-phase alternating current supply. Similarly, the primary winding 92 of electrical pick-up device 42 is electrically connected to $\phi_1$ of the two-phase alternating current supply, while the secondary winding 93 of the pick-up device 42 is electrically connected to the primary winding 51 of coordinate transformer 49. The secondary winding 52 of coordinate transformer 49 is electrically connected to the control winding 75 of follow-up motor 46, while the main field winding 83 of follow-up motor 46 is electrically connected to $\phi_2$ of the two-phase alternating current supply. Follow-up motor 46 is similar to follow-up motor 44 and details of their construction may be had by reference to said copending applications Serial Nos. 600,606 and 607,614.

Correction torques, to be described, are applied about the rotor axes of the two pendulums 29 and 30 by respective torque motors 70 and 71, whose rotors 70' and 71' are fixed in the corresponding rotor shafts of pick-up devices 27 and 28. Torque motors 70 and 71 are similar to torque motors 31 and 33 in construction and, as shown in FIG. 2, each has two field windings. Their main field windings 84 and 85 are energized from $\phi_2$ of the two-phase supply and their corresponding control windings 76 and 77 are energized jointly by the sum of several source voltages. One such source voltage input to control winding 77 of torque motor 71 is derived from electromechanical trigonometric resolver 65 which is similar in construction to the electrical pick-up devices 27, 28, 40 and 42, and its zero position is similarly selected so that its output voltage is directly proportional to the sine function of its displacement angle. It has but one secondary winding 66 rotated by shaft 65' through the base angle of a right triangle whose hypotenuse is to be resolved and it is rotated in the field provided by primary winding 64 energized by a voltage corresponding to the hypotenuse of that right triangle, all as will be described, as will the other source voltages to windings 76 and 77 of torque motors 70 and 71.

Mounted on vertical support 24 is the stator of a synchronous transmitter whose rotor is connected to shaft 54 of outer gimbal ring 21, so that its rotation angle in roll is continuously transmitted by transmitter 94 to remote points for use in stabilizing other remote instruments. Instantaneous roll angle is also indicated locally by a dial 95 carried by the extension of the shaft of the rotor of transmitter 94. Similarly, the instantaneous pitch angles of the unstable platform 26 are transmitted to remote points by synchronous transmitter 96 carried by outer gimbal ring 21, the rotor thereof being driven relatively to the stator by the supporting shaft 53 of outer vertical frame 17. A dial 97 secured to the rotor shaft of transmitter 96 provides visual indication locally of the instantaneous pitch angles of the stable element.

In operation of the system illustrated in FIGS. 1 and 2, any response to tilting of the unstable platform 26 may be resolved into two component movements, namely, pitch and roll. Thus, movement of the platform 26 from its level position in roll displaces the rotor of electrical pick-up device 40 from its zero position, due to the relative movement of inner gimbal ring 11 about the axis through bearings 12 and 13, thus inducing a voltage in secondary winding 91. In view of the small displacement angles to which the electrical pick-up devices 27, 28, 40 and 42 are subjected, the output voltages thereof are substantially proportional to the displacement angle of their rotor windings. The output voltage from the secondary winding 91 of the pick-up device 40 energizes the primary winding 48 of coordinate transformer 49, thus causing a voltage to be induced in secondary winding 50 of coordinate transformer 49, which in turn energizes the control winding 74 of follow-up motor 44 to exert a torque on its rotor 44'. Since rotor 44' is fixed in shaft 45 of outer stabilized gimbal ring 21 it rotates the same, together with outer vertical frame 17, about the axis defined by bearings 22 and 23, in the direction which restores the rotor of the pick-up device 40 to its zero position, i.e., where the output voltage of the secondary winding 91 of the pick-up device 40 is zero. This results in deenergization of the control winding 74 of follow-up motor 44 which has driven outer stabilized gimbal ring 21 about the axis through bearings 22 and 23, through the angle of roll of the unstable platform 26.

A movement of the platform 26 from its level position in pitch displaces the rotor of electrical pick-up device 42 from its zero position, due to the relative movement of inner gimbal ring 11 about the axis through bearings 14 and 15. The output voltage induced in the rotor winding 93 of the pick-up device 42 energizes the primary winding 51 of coordinate transformer 49 and the resulting voltage induced in secondary winding 52 of coordinate transformer 49 energizes the control winding 75 of follow-up motor 46. The resulting operation of follow-up motor 46 drives outer vertical frame 17 about the horizontal axis through bearings 19 and 20, in the direction which restores the rotor of the pick-up device 42 to its zero voltage-inducing position. This reduction of the output voltage of pick-up device 42 to zero deenergizes the control winding 75 of follow-up motor 46 which has driven outer vertical frame 17 about the axis through bearings 19 and 20, through the angle of pitch of the unstable platform 26. In these ways any movements of the unstable platform from its level position in roll, or pitch, or both, causes energization of the control windings of the follow-up motors 44 and 46, which stabilizes the outer gimbal system by means of equal follow-up roll and follow-up pitch movement and the stabilization of the outer gimbal system deenergizes the control windings of the follow-up motors and restores the system to neutral condition.

Referring now to the respective pitch and roll pendulums 29 and 30, they provide vertical reference axes and, in conjunction with their respective pick-up devices 27 and 28 and the torque motors 31 and 33 of the inner gimbal system, the spin axis of the gyroscope is caused to erect into true vertical position. In considering this erecting means for the gyroscope 10, it will be assumed that the aforementioned corrective means for the error-producing factors affecting the operation of the stable element, although not yet described, are nevertheless in operation, and that the stable element is placed into operation initially with the spin axis of the gyroscope 10 displaced from the true vertical position. As with the outer gimbal system, any tilting of the spin axis of the gyroscope 10 may be resolved into two components tilts, i.e., a tilt in roll and a tilt in pitch.

Considering first the operation of the erecting means for the gyroscope 10 in response to the tilt of its spin axis in roll, and assuming the aligned position of outer vertical frame 17 to be in agreement with the tilted position of the spin axis, the action of gravity on roll pendulum 30 angularly displaces the rotor winding 88 of electrical pick-up device 28 from its zero position. The voltage induced in the stator winding 89 of pick-up device 28 energizes the primary winding 38 of coordinate transformer 36, and the resulting voltage induced in the secondary winding 39 energizes the control winding 73 of torque motor 33, which accordingly applies a torque to inner gimbal ring 11 about the axis of inner gimbal ring 11 through bearings 14 and 15. The torque applied by torque motor 33 about the supporting axis of ring 11 results in the precession of the gyroscope 10 about the axis through bearings 12 and 13 in the direction which erects the spin axis of the gyroscope 10 into the true vertical.

The precession of the gyroscope 10 displaces the rotor winding 90 of electrical pick-up device 40 from its zero position, and the resulting voltage induced in the secondary winding 91 energizes the primary winding 48 of coordinate transformer 49. The resulting voltage induced in secondary winding 50 of coordinate transformer 49 energizes the control winding 74 of follow-up motor 44, which accordingly drives outer stabilized gimbal ring 21 and outer vertical frame 17, about the horizontal axis through bearings 22 and 23, in the direction which restores the pick-up device 28 of the roll pendulum 30 to the position where its rotor winding 88 lies in noninductive relation to stator winding 89, and the output voltage of the pick-up device 28 is thereby zero. Reduction of the output voltage of pick-up device 28 to zero results in deenergization of the control winding 73 of torque motor 33, so that torque is no longer applied to the gyroscope 10 about the axis through bearings 14 and 15 and precession of the gyroscope 10 about the axis through bearings 12 and 13 ceases, with the spin axis of the gyroscope 10 indicating the true vertical.

Now considering the operation of the erecting means for the gyroscope 10 in response to the tilt of its spin axis in pitch, and again assuming the aligned position of outer vertical frame 17 to be in agreement with the position of the spin axis, the action of gravity on pitch pendulum 29 angularly displaces the rotor winding 86 of electrical pick-up device 27 from its zero position, thus causing a voltage to be induced in stator winding 87. This output voltage energizes the primary winding 35 of coordinate transformer 36, which results in induction of a proportional voltage in the secondary winding 37, which in turn energizes the control winding 72 of torque motor 31 to cause the latter to apply a torque to the supporting axis of gyroscope 10 through bearings 12 and 13. Considering the spinning element of gyroscope 10 to be rotating in a clockwise direction as viewed from above, the operation of torque motor 31 results in a precession of the gyroscope about an axis aligned with bearings 14 and 15, i.e., in the direction which erects the spin axis of the gyroscope 10 into the true vertical.

This precession of the gyroscope 10 displaces the rotor winding 93 of electrical pick-up device 42 from its zero voltage-inducing position, and the resulting voltage induced therein energizes the primary winding 51 of coordinate transformer 49, thus inducing a voltage in secondary winding 52 of coordinate transformer 49, which energizes the control winding 75 of follow-up motor 46. Follow-up motor 46 accordingly drives outer vertical frame 17 about the horizontal axis through bearings 19 and 20 in the direction and to the position where no voltage is induced in the stator winding 87 of pick-up device 27. Since the output voltage of pick-up device 27 is zero, the control winding 72 of torque motor 31 becomes deenergized and torque is no longer applied to the supporting axis of gyroscope 10 through bearings 12 and 13, so that the precession of the gyroscope 10 about the axis through bearings 14 and 15 ceases, and the spin axis of the gyroscope indicates the true vertical.

Figures 3, 3A:
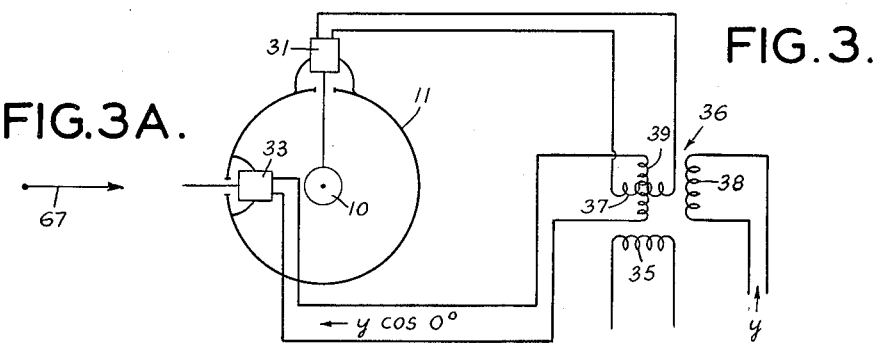
FIG. 3 is a schematic diagram of the inner rotating gimbal system, for the zero rotational position.
FIG. 3a is a vector diagram representing the direction and magnitude of the torque applied as described in connection with FIG. 3.
Figures 4, 4A:
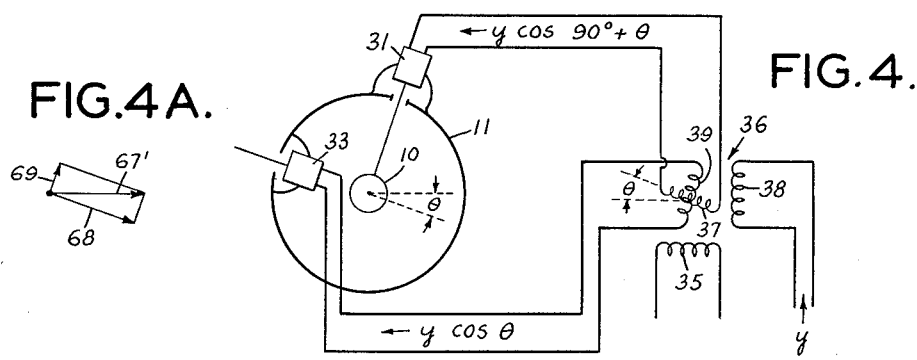

The purpose of coordinate transformers 36 and 49 is to provide continuous inductive coupling between the cooperating electrical pick-up devices 27, 28 and motors 31, 33 of the inner rotating gimbal system 11, 16, and the pick-up devices 40, 42 and motors 44, 46 of the outer stabilized gimbal system, for all rotational positions of the rotating inner gimbal system, so that the magnitude and direction of the resultant torque of the torques, applied by the two torque motors 31 and 33, and the magnitude and direction of the resultant torque of the torques applied by the two follow-up motors 44 and 46, remain fixed in space while the inner gimbal system is rotating. The selective coordinating or "unscrambling" effect produced by the coordinate transformers 36 and 49 is illustrated in FIGS. 3 and 4 of the drawings, in which FIG. 3 illustrates the operation of coordinate transformer 36 for the zero rotational position of the inner rotating gimbal system, represented by gimbal ring 11, as shown in FIGS. 1 and 2, and FIG. 4 illustrates the operation of coordinate transformer 36 for a rotational position where the inner rotating gimbal system, still represented by gimbal ring 11, is displaced through an angle $\theta$ from its zero position. For simplicity of description it is assumed that the maximum ratio of voltage transformation between a primary winding and a secondary winding of coordinate transformer 36 is unity, but it is understood that the maximum ratio of such voltage transformation could be of values other than unity.

Assuming that the spin axis of the gyroscope 10 of FIG. 1, is displaced in roll only, then the output voltage of the roll pendulum pick-up device 28 results in energization of primary winding 38 of coordinate transformer 36, while primary winding 35 of the coordinate transformer is not energized due to no accompanying displacement of the pitch pendulum pick-up device 27 from zero voltage inducing position. Inasmuch as the opposed windings of the coordinate transformer 36 are fixed in zero displacement angle position and as the cosine of 0° is equal to 1, it follows that the maximum inductive coupling exists between primary winding 38 and secondary winding 39, so that the voltage induced in secondary winding 39 is equal to the voltage applied to primary winding 38. The output voltage of secondary winding 39 energizes the control winding 73 of torque motor 33, and the torque applied to gimbal ring 11 about the axis through bearings 14 and 15 by torque motor 33 is indicated by torque vector 67 of FIG. 3a. No voltage is induced in secondary winding 37 of coordinate transformer 36 by primary windings 35 and 38, because primary winding 35 is not energized and secondary winding 37 is in space quadrature relation to secondary winding 39 on the rotor. Since the sine of 0° is equal to zero, no voltage is induced in secondary winding 37 by either primary winding 35 or 38, so that the control winding 72 of torque motor 31 is not energized.

In FIG. 4 the inner rotating gimbal system, represented by 11, is in the position where it is displaced from its zero rotational position through an angle $\theta$, and the spin axis of the gyroscope of FIG. 1 is displaced through the same roll angle that was used in the description of FIG. 3. The voltage applied to primary winding 38 of coordinate transformer 36 induces in secondary winding 39 a voltage equal to $Y \cos \theta$, and induces in secondary winding 37 a voltage equal to $Y \cos 90° + \theta$, ($Y \cos 90° + \theta$ is equal to $-Y \sin \theta$), where Y is the magnitude of the voltage applied to primary winding 38.

The torque ector 69 in FIG. 4a indicates the magnitude and direction of the torque produced by torque motor 31, while the torque vector 68 indicates the magnitude and direction of the torque produced by torque motor 33. Composition of torque vectors 68 and 69 produces resultant torque vector 67' which is of the same magnitude and direction as torque vector 67 of FIG. 3a. It is thus seen that the magnitude and direction of the resultant torque of torque motors 31 and 33, represented by the like vectors 67' and 67, remain fixed in space for all rotational positions of the rotating inner gimbal system 11. Clearly, when the spin axis of the gyroscope 10 is displaced both in roll and pitch, the resultant torque of the two torque motors 31 and 33 takes a new position in space, and the magnitude and direction of this new resultant torque remain fixed in space for all rotational positions of the inner rotating gimbal system.

Coordinate transformer 49 "unscrambles" the voltages which are applied to the control windings of follow-up motors 44 and 46 by pick-up devices 40 and 42 in the same manner as described in connection with coordinate transformer 36.

The aforementioned corrections will now be discussed, beginning with a correction for earth's rotation, called latitude error which may be defined as the apparent precession of the gyroscope due to the rotation of the earth and which appears to an observer as a tilt of the spin axis of the gyroscope, although it is actually the working of the inherent rigidity of plane law which governs the operation of gyroscopes, whereby the spin axis of the gyroscope remains fixed in space while the earth rotates, unless the gyroscope is acted upon by external forces. The effect of the latitude error may be compensated by applying a torque which is proportional to $L \cos \lambda$, wherein $L=Hw$, $H=$angular momentum of gyroscope wheel, $w=$angular velocity of the earth, and $\lambda=$latitude. This torque is obtained from a voltage proportional to L, which is derived from $\phi_1$ of the two-phase alternating current supply, and is applied to the primary winding 57 of electrical resolver 58 whose displacement angle $\lambda$ is obtained from the mechanical input of $\lambda$, in turn obtained from a suitable external source driving rotor shaft 58'. The voltage consequently induced in the secondary winding 59 of resolver 58 is proportional to $L \cos \lambda$, and this is applied to the primary winding 60 of electrical resolver 61, whose rotor is displaced through angle $C_0$, obtained from the mechanical input of $C_0$ or own ship's course, applied to rotor shaft 61'. The resulting voltage induced in secondary winding 62 of resolver 61 is proportional to $L \cos \lambda \sin C_0$, and is applied in series to the primary winding 35 of coordinate transformer 36 as shown in FIG. 2. The voltage induced in the other secondary winding 63 of resolver 61 is proportional to $L \cos \lambda \cos C_0$, and is applied in series to the primary winding 38 of coordinate transformer 36. The output voltages of secondary windings 37 and 39 of coordinate transformer 36 are accordingly modified by the latitude correcting voltages, and, when applied respectively to the control windings 72 and 73 of torque motors 31 and 33 in the manner previously described, the resultant torque which is applied about an east-west axis of the gyroscope 10 causes precision thereof eastward about a north-south axis at a rate to compensate for the apparent precession caused by the latitude error.

The description of the operation of the stable element for movements of the unstable platform 26 in roll and pitch has been made for the instantaneous condition where the inner gimbal system 11, 16 lies in the position shown in FIGS. 1 and 2, for the purpose of simplicity of description. However, the inner gimbal system is not only rotated about a vertical axis by means of gimbal rotation motor 18, but its direction of rotation is periodically reversed by reversing switch 55 actuated by cam 55' driven from motor shaft 18' by reducing gearing 19'. The purposes of such reversing rotation of the inner gimbal system 11, 16 are to eliminate (a) the precession of the gyroscope caused by the friction in the bearings of the inner gimbal system, (b) the precession of the gyroscope due to the flexes stiffness reactance, (c) the precession of the gyroscope due to the centrifugal force of rotating inner gimbal ring 11 when tilted, and (d) the precession of the gyroscope caused by any unbalance in the gyroscope and inner gimbal system, correction (d) being independent of the magnitude and direction of the unbalance.

It is not essential that the inner rotating gimbal system be periodically reversed in order to obtain the corrections of (b), (c), and (d), above, as these corrections can also be obtained by continuous rotation of the inner gimbal system in one direction only, but it is preferred in order to eliminate bearing friction precession. The spin axis of a vertical spin axis gyroscope supported in a rotating gimbal system tends to align itself by the shortest path with the axis about which the gimbal system is rotating, and not with the true vertical, because of the friction in the gimbal bearings. The periodic reversing of the direction of rotation of the rotating gimbal system effectively eliminates the precession of the gyroscope caused by the friction in the gimbal bearings of the rotating gimbal system.

The reversing switch 55 for effecting this reversal may be operated by any conventional type of arrangement, such as by the cam 55' and gearing 19' shown in FIG. 2, whereby the inner gimbal system is rotated by gimbal rotation motor 18 from an initial starting position through a generated angle in one direction of rotation to a predetermined position, at which point the reversing switch 55 is mechanically operated by cam 55'. The gimbal rotation motor thereby reverses its direction of rotation and drives the inner gimbal system back through the generated angle to the initial starting position, at which point the reversing switch is again mechanically operated by cam 55', and the above-described reversing procedure for the direction of rotation of the inner gimbal system is continued as long as the system is in operation. Switch 55 reverses the direction of rotation of gimbal rotation motor 18 by changing the phase sequence of the two-phase alternating voltages which are applied to the motor, the main field winding 78 of motor 18 being energized from $\phi_2$, while the control field winding 79 of the motor is energized from $\phi_1$ of the two-phase alternating current supply. Since the reversing switch 55 is interposed in the electrical circuit between $\phi_1$ of the two-phase alternating current supply and control field winding 79 of the motor, the reversing switch 55 automatically reverses the electrical connections to control field winding 79.

Figure 5:
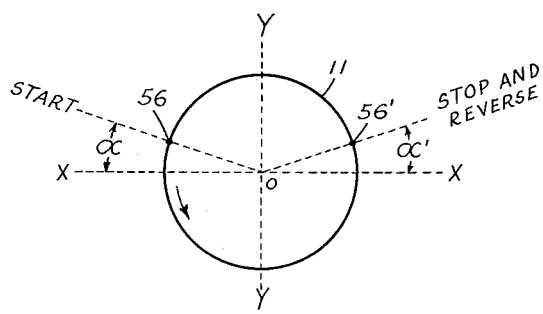
FIG. 5 is a diagrammatic illustration of the reversing points of the direction of rotation of the inner rotating gimbal system.

The two predetermined positions at which the reversal of rotation of the rotating inner gimbal system 11, 16 by motor 18 occurs are chosen so that any point on the inner rotating gimbal system and supported gyroscope 10 divides its time equally between both sides of an arbitrarily selected center line in the plane in which the inner gimbal system 11, 16 rotates. This plane is indicated in FIG. 5 by coordinates X—X and Y—Y in the horizontal plane in which the inner gimbal ring 11 is rotating about the vertical axis through point O. A point 56 on inner gimbal ring 11 is in its initial starting position at an angle $\alpha$ from the X—X axis. Gimbal rotation motor 18 causes inner gimbal ring 11 to rotate in a counter-clockwise direction through a predetermined number of complete revolutions, and in addition through a predetermined part of another revolution, at which point the reversing switch 55 is automatically operated by cam 55' to thereby cause motor 18 to run in the opposite direction. The automatic reversing mechanism 55, 55', 18', 19' is so adjusted that rotation of inner gimbal ring 11 is stopped and reversed at the position where point 56 on the inner gimbal ring 11 is in a new location 56′.

The new location 56′ is at an angle α′ from the X—X axis, where angle α′ is equal to α. The angle α is chosen so that the point 56 on inner gimbal ring 11 spends an equal amount of time on both sides of the Y—Y axis, so that the precession caused by the friction in the bearings of the inner gimbal system, and the precession caused by any unbalance in the gyroscope and inner gimbal system, are eliminated.

The effects of constant errors in the stable element system, if not completely counteracted and neutralized, result in the precession of the gyroscope 10, which tilts the spin axis of the gyroscope out of the true vertical position. The response of pick-up devices 40 and 42 to the tilting of the spin axis of the gyroscope 10 energizes follow-up motors 44 and 46 to drive outer vertical frame 17 and thereby displace the rotors of the pendulum pick-up devices 27 and 28 from their zero displacement angle positions as described. The output voltages of the pendulum pick-up devices 27 and 28 energize torque motors 31 and 33, and the torques applied by said torque motors result in the precession of the gyroscope in the direction to correct for the precession of the gyroscope resulting from the effects of the constant errors in the stable element system. The displacement angles of the pendulum pick-up devices 27 and 28 are of the values whereby the torques applied by torque motors 31 and 33 in response to the output voltages of the pendulum pick-up devices 27 and 28, result in the precession of the gyroscope at a rate which is equal in magnitude and opposed in direction to the rate of precession of the gyroscope resulting from the effects of the constant errors in the stable element system. It is thus seen that the corrective rate of precession of the gyroscope to correct for constant error effect is obtained at the expense of the constant displacement of the rotors of the pendulum pick-up devices from their zero displacement angle positions, and a constant displacement of the spin axis of the gyroscope from the true vertical.

FIG. 6 illustrates the corrective means of this invention for eliminating the effects of constant errors in the stable element system, whereby the corrective precession of the gyroscope is obtained without disturbing the spin axis of the gyroscope from the true vertical position. FIG. 6 illustrates a modified portion of FIG. 2, for the instantaneous position of the inner rotating gimbal system indicated in FIG. 1, and for the condition where the spin axis of the gyroscope 10 is displaced from the true vertical in pitch only. The input terminals of an electronic amplifier 100 are electrically connected in series with the output terminals of an alternating current generator 101, and this series circuit is electrically connected in parallel with the output winding 87 of the pitch pendulum pick-up device 27. The output terminals of amplifier 100 are electrically connected to alternating current motor 102 which drives alternating current generator 101 and the contact arm 103 of potentiometer 104. The end terminals of the winding of potentiometer 104 are electrically connected to $\phi_1$ of the two phase alternating current supply, and the mid-tap 105 of the winding of potentiometer 104 is electrically connected in series with the primary winding 35 of coordinate transformer 36.

In operation of the error correcting means of FIG. 6, the constant error output voltage of the pitch pendulum pick-up device 27 is the input to amplifier 100. The output voltage of amplifier 100 energizes motor 102 which drives generator 101 and the contact arm 103 of potentiometer 104. The output voltage of generator 101 opposes the output voltage of the pitch pendulum pick-up device 27, to thereby reduce the input voltage applied to amplifier 100, for purposes of damping and stability. The positioning of contact arm 103 away from mid-tap 105 on the winding of potentiometer 104, by motor 102, increases the input voltage applied to primary winding 35 of coordinate transformer 36, and the resulting precession of the gyroscope 10 erects the spin axis of the gyroscope into the true vertical position, and thereby restores the rotor of pitch pendulum pick-up device 27 to its zero displacement position where the output voltage of the pick-up device 27 is zero. When the output voltage of pitch pendulum pick-up device 27 is zero, the input voltage applied to amplifier 100 is zero, so that motor 102 in running and positioning contact arm 103 of potentiometer 104, effectively deenergizes itself at the point where the output voltage or potentiometer 104 replaces the constant error output voltage of the pitch pendulum pick-up device 27.

A similar arrangement of parts and circuits is provided for the roll pendulum pick-up device 28, so that the effects of constant errors in the stable element system are eliminated.

Considering the possible errors introduced by the use of pitch and roll pendulums 29 and 30, it is evident that pendulums are acted upon by acceleration forces other than gravity, which if not considered and their effects neutralized, result in displacements of the pendulums to positions where the apparent vertical and not the true vertical is indicated by them. In order to neutralize the effects of such acceleration forces, corrective torques are automatically applied to the pendulums, so that they are not displaced from their true vertical positions as a result of acceleration forces other than gravity acting upon them. The corrective torque to neutralize the tendency of the pitch pendulum 29 to be displaced by the acceleration force due to the rate of change of speed of own ship is proportional to $$\frac{d}{dt}S_o$$

where $S_o$ is own ship's speed. This corrective torque is obtained as a voltage proportional to $$\frac{d}{dt}S_o$$

derived from $\phi_1$ of the two-phase alternating current supply, and applied to the control winding 76 of torque motor 70 which is mechanically coupled to the shaft which is angularly displaced by movements of the pitch pendulum 29. The resulting torque of torque motor 70 is proportional to $$\frac{d}{dt}S_o$$

and effectively opposes and neutralizes the tendency of the pitch pendulum 29 to be displaced by the acceleration forces due to the rate of change of speed of own ship.

The corrective torque to neutralize the tendency of the pitch pendulum 29 to be displaced by the acceleration force due to the skid effect during turning of own ship, is proportional to $(\dot{C}_0)^2 l$, where $\dot{C}_0$ is the first time rate of change of own ship's course and $l$ is the distance between the pivot point of own ship and the stable element. This corrective torque is obtained as a voltage proportional to $(\dot{C}_0)^2 l$ derived from $\phi_1$ of the two-phase alternating current supply, and applied to the control winding 76 of torque motor 70. The resulting torque of torque motor 70 is proportional to $(C_0)^2 l$, and effectively opposes and neutralizes the tendency of the pitch pendulum 29 to be displaced by the acceleration force due to the skid effect during turning of own ship.

The corrective torque to neutralize the tendency of the roll pendulum 30 to be displaced by the acceleration force due to Coriolis' acceleration is proportional to $2\omega S_0 \sin \lambda$, where $\omega$ is the angular velocity of the earth, $S_o$ is own ship's speed, and $\lambda$ is the latitude. This corrective torque is obtained as a voltage proportional to $2\omega S_0$, derived from $\phi_1$ of the two-phase alternating current supply and applied to the primary winding 64 of electrical resolver 65 whose displacement angle $\lambda$ is obtained from the mechanical input of $\lambda$. The output voltage of the secondary winding 66 of resolver 65 is proportional to $2\omega S_0 \sin \lambda$, and this voltage is applied to the control winding 77 of torque motor 71 which is mechanically coupled to the shaft which is angularly displaced by movements of the roll pendulum 30. The resulting torque of torque motor 71 is proportional to $2\omega S_0 \sin \lambda$, and this torque effectively opposes and neutralizes the tendency of the roll pendulum 30 to be displaced by the acceleration force due to Coriolis' acceleration.

The corrective torque to neutralize the tendency of the roll pendulum 30 to be displaced by the acceleration force due to the rate of change of course of own ship, is proportional to $S_0\dot{C}_0$, where $S_0$ is own ship's speed, and $\dot{C}_0$ is the first time rate of change of own ship's course. This corrective torque is obtained as a voltage proportional to $S_0\dot{C}_0$, derived from $\phi_1$ of the two-phase alternating current supply and applied to the control winding 77 of torque motor 71. The resulting torque of torque motor 71 is proportional to $S_0\dot{C}_0$, and this torque effectively opposes and neutralizes the tendency of the roll pendulum 30 to be displaced by the acceleration force due to the rate of change of course of own ship.

The corrective torque to neutralize the tendency of the roll pendulum 30 to be displaced by the acceleration force due to the east-west motion of own ship, is proportional to $$\frac{(S_0')^2}{R} \tan \lambda$$

where $S_0'$ is east-west component of own ship's speed, $R$ is the radius of the earth, and $\lambda$ is the latitude. This corrective torque is obtained as a voltage proportional to $$\frac{(S_0')^2}{R} \tan \lambda$$

derived from $\phi_1$ of the two-phase alternating current supply, and applied to the control winding 77 of torque motor 71. The resulting torque of torque motor 71 is proportional to $$\frac{(S_0')^2}{R} \tan \lambda$$

and this torque effectively opposes and neutralizes the tendency of the roll pendulum 30 to be displaced by the acceleration force due to the east-west motion of own ship.

The flexes stiffness reactance of the inner gimbal system 11, 16 is neutralized in the stabilizing mechanism of this invention by the rotation of the inner gimbal system in conjunction with the use of a preloaded upsetting spring. Flexes are defined for the purpose of this description, as the flexible electrical connections that are required to conduct electricity to and from the gyroscope 10 and the various electrical units of the stable element, between relatively moving mechanical parts where brushes and contact rings are not practicable. For example, flexes are those wires which carry the polyphase alternating current supply from inner vertical frame 16 to gyroscope 10, as indicated at 106 in FIG. 8, where such wires are designated 106. It is found in practice that the most flexible of flexes produce a reactance in the form of spring effects between the relatively moving mechanical parts, which result in undesirable precession of the gyroscope, and may be neutralized in the case of the inner rotating gimbal system by the use of a preloaded upsetting spring in conjunction with a bearing. Such an arrangement is illustrated in FIGS. 7 and 8 where the upsetting spring 98 is arranged to act in conjunction with the bearing 13 of the system of inner gimbal ring 11, but it will be understood the same neutralizing effect will be obtained if the upsetting spring 98 is installed to operate in conjunction with any gimbal bearing of the inner rotating gimbal system.

Referring to FIG. 7, the gyroscope 10 is shown in the position where its vertical spin axis is perpendicular to the plane of rotation of inner gimbal ring 11. The upsetting spring 98 is secured at its upper end to a bracket 99 which is secured to and extends out from the case of gyroscope 10, while the lower end of the spring 98 is secured to inner gimbal ring 11, below bearing 13. The longitudinal axis through upsetting spring 98 intersects the rotational axis of supporting shaft 41 of gyroscope 10, so that as long as the condition illustrated in FIG. 7 obtains, no torque is produced by spring 98 about shaft 41. However, as soon as relative movement occurs between inner gimbal ring 11 and shaft 41, the upsetting spring 98 is displaced from and at an angle to, its neutral or zero torque producing position, and accordingly applies a torque to inner gimbal ring 11 about shaft 41, in opposition to the torque produced by the flexes stiffness reactance which occurs at the same time. The preloading of upsetting spring 98 is of the magnitude to effectively counteract the flexes stiffness reactance of the entire inner rotating gimbal system, and such preloading is independent of the speed of rotation of the rotating inner gimbal system.

Alternatively, proportioned inertia means may be used instead of the preloaded upsetting spring to neutralize the effect of the flexes stiffness reactance of electrical leads and the like, because in a rotating gimbal system the inertia reactance of the rotating mass is directly opposed in effect to the flexes stiffness reactance. By proportioning the magnitude of the flexes stiffness reactance and the inertia reactance of the rotating system, so that they are equal to each other, the effect of the flexes stiffness reactance is neutralized. This is accomplished by adding properly chosen and placed weights to the rotating inner gimbal system to increase its inertia, or by increasing the stiffness of the flexes, or by a combination of both. Thus, the centrifugal force of rotating inner gimbal ring 11, when tilted, acts in the same manner as the flexes stiffness reactance, that is, it produces a spring effect between the relatively moving mechanical parts. This reactance or spring effect is counteracted and neutralized by additional preloading of upsetting spring 98, or by the use of additional proportional inertia means.

Although a preferred embodiment of the invention has been illustrated and described herein, it is to be understood that the invention is not limited thereby, but is susceptible of changes in form and detail within the scope of the appended claims.

I claim:

1. A stabilizing system adapted to be mounted on an unstable support, the combination of a follow-up member universally mounted on said support, a gyroscope suspended in a gimbal mounting on said follow-up member, means for rotating said gimbal mounting about a substantially vertical axis, motive means operatively connected to said gyroscope for precessing the same, a pendulum on said follow-up member responsive to deviation of the latter from the true vertical, operative connections between said pendulum and said motive means for inducing precession of said gyroscope to maintain said follow-up member in a predetermined position relatively to said pendulum, motive means operatively connected to said pendulum for controlling the same, means responsive to acceleration forces other than gravity acting on said pendulum, and operative connections between said last-named responsive and motive means for neutralizing the effects of said forces on said pendulum.

2. A stabilizing system adapted to be mounted on an unstable support, the combination of a follow-up member universally mounted on said support, a gyroscope suspended in a gimbal mounting on said follow-up member, means for rotating said gimbal mounting about a substantially vertical axis, follow-up mechanism responsive to relative movement between said gyroscope and said follow-up member for actuating said follow-up member to follow said gyroscope, motive means operatively connected to said gyroscope for precessing the same, a pendulum on said follow-up member responsive to deviation of the latter from the true vertical, operative connections between said pendulum and said motive means for inducing precession of said gyroscope to cause said follow-up mechanism to maintain said follow-up member in a predetermined position relatively to said pendulum, motive means operatively connected to said pendulum for controlling the same, means responsive to acceleration forces other than gravity acting on said pendulum, and operative connections between said last-named responsive and motive means for neutralizing the effects of said forces on said pendulum.

3. A stabilizing system adapted to be mounted on an unstable support, the combination of a follow-up member universally mounted on said support, a gyroscope suspended in a gimbal mounting on said follow-up member, means for rotating said gimbal mounting about a substantially vertical axis, motive means operatively connected to said gyroscope for precessing the same in the roll plane of said support, a pendulum on said follow-up member responsive to deviation of the latter from the true vertical in the roll plane of said support, operative connections between said pendulum and said motive means for inducing precession of said gyroscope in the roll plane of said support to maintain said follow-up member in a predetermined position relatively to said pendulum, motive means operatively connected to said pendulum for controlling the same, means responsive to acceleration forces other than gravity acting on said pendulum, and operative connections between said last-named responsive and motive means for neutralizing the effects of said forces on said pendulum.

4. A stabilizing system adapted to be mounted on an unstable support, the combination of a follow-up member universally mounted on said support, a gyroscope suspended in a gimbal mounting on said follow-up member, means for rotating said gimbal mounting about a substantially vertical axis, motive means operatively connected to said gyroscope for precessing the same in the pitch plane of said support, a pendulum on said follow-up member responsive to deviation of the latter from the true vertical in the pitch plane of said support, operative connections between said pendulum and said motive means for inducing precession of said gyroscope in the pitch plane of said support to maintain said follow-up member in a predetermined position relatively to said pendulum, motive means operatively connected to said pendulum for controlling the same, means responsive to acceleration forces other than gravity acting on said pendulum, and operative connections between said last-named responsive and motive means for neutralizing the effects of said forces on said pendulum.

5. A stabilizing system adapted to be mounted on an unstable support, the combination of a follow-up member universally mounted on said support, a gyroscope suspended in a gimbal mounting on said follow-up member, means for rotating said gimbal mounting about a substantially vertical axis, motive means operatively connected to said gyroscope for precessing the same in the respective roll and pitch planes of said support, a pair of pendulums pivoted in the roll and pitch planes of said support on said follow-up member responsive to deviation of the latter from the true vertical in said respective roll and pitch planes, operative connections between said pendulums and said corresponding motive means for inducing precession of said gyroscope in the corresponding plane to maintain said follow-up member in a predetermined position relatively to said pendulum, motive means operatively connected to each pendulum for controlling the same, means responsive to acceleration forces other than gravity acting on each pendulum, and operative connections between said last-named responsive and motive means for neutralizing the effects of said forces on the corresponding pendulum.

6. A stabilizing system adapted to be mounted on an unstable support, the combination of a follow-up member universally mounted on said support, a gyroscope suspended in a gimbal mounting on said follow-up member, means for rotating said gimbal mounting about a substantially vertical axis, motive means operatively connected to said gyroscope for precessing the same, a pendulum on said follow-up member responsive to deviation of the latter from the true vertical, operative connections between said pendulum and said motive means for inducing precession of said gyroscope to maintain said follow-up member in a predetermined position relatively to said pendulum, means responsive to changes in course of said support interposed on said connections for modifying the operation of said motive means accordingly, motive means operatively connected to said pendulum for controlling the same, means responsive to acceleration forces other than gravity acting on said pendulum, and operative connections between said last-named responsive and motive means for neutralizing the effects of said forces on said pendulum.

7. A stabilizing system adapted to be mounted on an unstable support, the combination of a follow-up member universally mounted on said support, a gyroscope suspended in a gimbal mounting on said follow-up member, means for rotating said gimbal mounting about a substantially vertical axis, motive means operatively connected to said gyroscope for precessing the same, a pendulum on said follow-up member responsive to deviation of the latter from the true vertical, operative connections between said pendulum and said motive means for inducing precession of said gyroscope to maintain said follow-up member in a predetermined position relatively to said pendulum, means responsive to changes in latitude of said support interposed in said connections for modifying the operation of said motive means accordingly, motive means operatively connected to said pendulum for controlling the same, means responsive to acceleration forces other than gravity acting on said pendulum, and operative connections between said last-named responsive and motive means for neutralizing the effects of said forces on said pendulum.

8. A stabilizing system adapted to be mounted on an unstable support, the combination of a follow-up member universally mounted on said support, a gyroscope suspended in a gimbal mounting on said follow-up member, means for rotating said gimbal mounting about a substantially vertical axis on said follow-up member, electrical motive means operatively connected to said gyroscope for precessing the same, a pendulum on said follow-up member responsive to deviation of the latter from the true vertical, electrical generating means actuated by said pendulum, operative connections between said pendulum generating means and said motive means for inducing precession of said gyroscope to maintain said follow-up member in a predetermined position relatively to said pendulum, and means responsive to the voltage developed by said electrical generating means for modifying the connections between the latter and said motive means to modify the precession of the gyroscope.

9. A stabilizing system adapted to be mounted on an unstable support, the combination of a follow-up member universally mounted on said support, a gyroscope suspended in a gimbal mounting on said follow-up member, means for rotating said gimbal mounting about a substantially vertical axis on said follow-up member, electrical motive means operatively connected to said gyroscope for precessing the same in the pitch plane of said support, a pendulum on said follow-up member responsive to deviation of the latter from the true vertical in the pitch plane of said support, electrical generating means actuated by said pendulum, operative connections between said pendulum generating means and said motive means for inducing precession of said gyroscope in the pitch plane of said support to maintain said follow-up member in a predetermined position relatively to said pendulum, and means responsive to the voltage developed by said electrical generating means for modifying the connections between the latter and said motive means to modify the precession of the gyroscope.

10. A stabilizing system adapted to be mounted on an unstable support, the combination of a follow-up member universally mounted on said support, a gyroscope suspended in a gimbal mounting on said follow-up member, electrical motive means operatively connected to said gyroscope for precessing the same, a pendulum pivoted about a horizontal axis on said follow-up member responsive to deviation of the latter from the true vertical, a transformer winding carried by and rotatable with said pendulum pivot, an inductively coupled transformer winding on said follow-up member, operative connections between one of said transformer windings and said motive means for inducing precession of said gyroscope to maintain said follow-up member in a predetermined position relatively to said pendulum, variable voltage means interposed in said connections for modifying the voltage applied to said motive means for correcting the operation of said motive means accordingly, and second motive means responsive to the voltage developed in said one transformer winding for adjusting a potentiometer to compensate for the constant error of said gyroscope.

11. A stabilizing system adapted to be mounted on an unstable support, the combination of a follow-up member universally mounted on said support, a gyroscope suspended in a gimbal mounting on said follow-up member, electrical motive means operatively connected to said gyroscope for precessing the same, a pendulum pivoted about a horizontal axis on said follow-up member responsive to deviation of the latter from the true vertical, a transformer winding carried by and rotatable with said pendulum pivot, an inductively coupled transformer winding on said follow-up member, a second transformer having relatively movable windings, connections between one of said second transformer windings and said follow-up winding, connections between said other second transformer winding and said motive means, means for rotating said gyroscope about a substantially vertically axis, and operative connections between said means and one of said second transformer windings, whereby the precession of the gyroscope induced by said pendulum is modified in accordance with the rotative position of said gyroscope.

12. A stabilizing system adapted to be mounted on an unstable support, the combination of a follow-up member universally mounted on said support, a gyroscope suspended in a gimbal mounting on said follow-up member, electrical motive means operatively connected to said gyroscope for precessing the same, a pendulum pivoted about a horizontal axis on said follow-up member responsive to deviation of the latter from the true vertical, a transformer winding carried by and rotatable with said pendulum pivot, an inductively coupled transformer winding on said follow-up member, a second transformer having relatively movable windings, connections between one of said second transformer windings and said follow-up winding, means interposed on said last-named connections for introducing corrections therein, connections between said other second transformer winding and said motive means, means for rotating said gyroscope about a substantially vertical axis, and operative connections between said means and one of said second transformer windings, whereby the precession of the gyroscope induced by said pendulum is modified in accordance with the rotative position of said gyroscope.

13. A stabilizing system including a vertical axis gyroscope suspended in a gimbal mounting on an unstable support, the combination of means for rotating said gimbal mounting about an axis substantially perpendicular to the plane of the support, means for exerting a torque couple about at least one of the gimbal axes of said mounting, an induction resolver having a rotor winding rotated with said mounting and having a stator winding, a pendulum responsive to deviation of said mounting from the true vertical for supplying to said induction resolver stator winding a voltage having a magnitude in accordance with said deviation, thereby inducing in said rotor winding a voltage proportional to said deviation and to a trigonometric function of the relative angular displacement between said rotor and stator windings, and operative connections between said rotor winding and said torque exerting means, whereby said means exerts a torque couple about said gimbal axis.

14. A stabilizing system including a vertical axis gyroscope suspended in a gimbal mounting on an unstable support and rotated about an axis substantially perpendicular to the plane of the support, the combination of means for exerting a torque couple about at least one of the gimbal axes of said mounting, an induction resolver having a rotor winding rotated with said mounting and having a stator winding, a pendulum responsive to deviation of said mounting from the true vertical in the roll plane for supplying to said induction resolver stator winding a voltage having a magnitude in accordance with said deviation, thereby inducing in said rotor winding a voltage proportional to said deviation and to a trigonometric function of the relative angular displacement between said rotor and stator windings, and operative connections between said rotor winding and said torque exerting means, whereby said means exerts a torque couple about said gimbal axis.

15. A stabilizing system including a vertical axis gyroscope suspended in a gimbal mounting on an unstable support and rotated about an axis substantially perpendicular to the plane of the support, the combination of means for exerting a torque couple about at least one of the gimbal axes of said mounting, an induction resolver having a rotor winding rotated with said mounting and having a stator winding, a pendulum responsive to deviation of said mounting from the true vertical in the pitch plane for supplying to said induction resolver stator winding a voltage having a magnitude in accordance with said deviation, thereby inducing in said rotor winding a voltage proportional to said deviation and to a trigonometric function of the relative angular displacement between said rotor and stator windings, and operative connections between said rotor winding and said torque exerting means, whereby said means exerts a torque couple about said gimbal axis.

16. A stabilizing system including a vertical axis gyroscope suspended in a gimbal mounting on an unstable support and rotated about an axis substantially perpendicular to the plane of the support, the combination of means for exerting a torque couple about at least one of the gimbal axes of said mounting, an induction resolver having a rotor winding rotated with said mounting and having a stator winding, a pendulum responsive to deviation of said mounting from the true vertical for supplying to said induction resolver stator winding a voltage having a magnitude in accordance with said deviation, thereby inducing in said rotor winding a voltage proportional to said deviation and to a trigonometric function of the relative angular displacement between said rotor and stator windings, operative connections between said rotor winding and said torque exerting means, whereby said means exerts a torque couple about said gimbal axis, motive means operatively connected to said pendulum for controlling the same, and means responsive to acceleration forces other than gravity acting on said pendulum for energizing said motive means to neutralize the effects of said forces on said pendulum.

17. A stabilizing system adapted to be mounted on an unstable support, the combination of a vertical axis gyroscope suspended on an inner gimbal mounting, an outer gimbal mounting suspending said inner gimbal mounting on said support, motive means rotating said inner gimbal mounting about a vertical axis, and reversing mechanism interposed between said motive means and said inner gimbal mounting for periodically reversing the direction of rotation of said inner gimbal mounting.

18. A stabilizing system adapted to be mounted on an unstable support, the combination of a vertical axis gyroscope suspended on an inner gimbal mounting, an outer gimbal mounting suspending said inner gimbal mounting on said support, motive means rotating said inner gimbal mounting about a vertical axis, reversing mechanism interposed between said motive means and said inner gimbal mounting for periodically reversing the direction of rotation of said inner gimbal mounting, and mechanism interposed between said reversing mechanism and said motive means for predetermining equal angular rotative movements of said inner gimbal mounting.

19. A stabilizing system adapted to be mounted on an unstable support, the combination of a vertical axis gyroscope suspended on an inner gimbal mounting, an outer gimbal mounting suspending said inner gimbal mounting on said support, electrical motive means rotating said inner gimbal mounting about a vertical axis, a source of electric power connected to said motive means, and a reversing switch interposed between said motive means and said power source for periodically reversing the direction of rotation of said inner gimbal mounting.

20. A stabilizing system adapted to be mounted on an unstable support, the combination of a vertical axis gyroscope suspended on an inner gimbal mounting, an outer gimbal mounting suspending said inner gimbal mounting on said support, electrical motive means rotating said inner gimbal mounting about a vertical axis, a two-phase power source, a main field winding for said motive means energized from one phase of said power source, a control field winding for said motive means energized from the other phase of said power source, a switch interposed between said other phase and said control field winding for reversing the connections to the latter, and reversing mechanism interposed between said motive means and said switch and driven by said motive means for periodically reversing the direction of rotation of said inner gimbal mounting.

21. A stabilizing system adapted to be mounted on an unstable support, the combination of an electrically driven gyroscope, a gimbal suspension for said gyroscope mounted on said support having relatively movable parts incuding inner and outer gimbal rings journalled together with the gyroscope journalled on said inner gimbal ring, flexible electrical conductors extending between at least two of said relatively movable parts and affording some resistance to free relative movement between said last-named parts, and means independent of said conductors on at least one of said last-named parts for neutralizing said resistance, whereby substantially complete freedom of relative movement between said last-named parts is afforded.

22. A stabilizing system adapted to be mounted on an unstable support, the combination of an electrically driven gyroscope, a gimbal suspension for said gyroscope mounted on said support having relatively movable parts including inner and outer gimbal rings journalled together with the gyroscope journalled on said inner gimbal ring, flexible electrical conductors extending between at least two of said relatively movable parts and affording some resistance to free relative movement between said last-named parts, and spring means independent of said conductors extending between said last-named parts for neutralizing said resistance, whereby substantially complete freedom of relative movement between said last-named parts is afforded.

23. A stabilizing system adapted to be mounted on an unstable support, the combination of an electrically driven gyroscope, a gimbal suspension for said gyroscope mounted on said support having relatively movable parts including inner and outer gimbal rings journalled together with the gyroscope journalled on said inner gimbal ring, flexible electrical conductors extending between at least two of said relatively movable parts and affording some resistance to free relative movement between said last-named parts, and a preloaded upsetting spring extending between said last-named parts across the corresponding journal between them and in the vertical plane of said journal for neutralizing said resistance, whereby substantially complete freedom of relative movement between said last-named parts is afforded.

References Cited in the file of this patent

UNITED STATES PATENTS

| | | |
|---|---|---|
| 1,942,470 | Bassett | Jan. 9, 1934 |
| 2,209,735 | Lauck | July 30, 1940 |
| 2,293,092 | Wittkuhns | Aug. 18, 1942 |
| 2,311,652 | Esval | Feb. 23, 1943 |
| 2,382,993 | Haskins | Aug. 21, 1945 |
| 2,411,087 | Ford et al. | Nov. 12, 1946 |
| 2,417,081 | Lynn | Mar. 11, 1947 |
| 2,431,304 | Carter | Nov. 25, 1947 |
| 2,493,015 | Newton | Jan. 3, 1950 |
| 2,517,612 | Varian | Aug. 8, 1950 |